July 9, 1940. J. F. HALDEMAN 2,207,514
EMULSIFYING AERATING DEVICE FOR FISH CONTAINERS
Filed Dec. 6, 1937 2 Sheets-Sheet 1
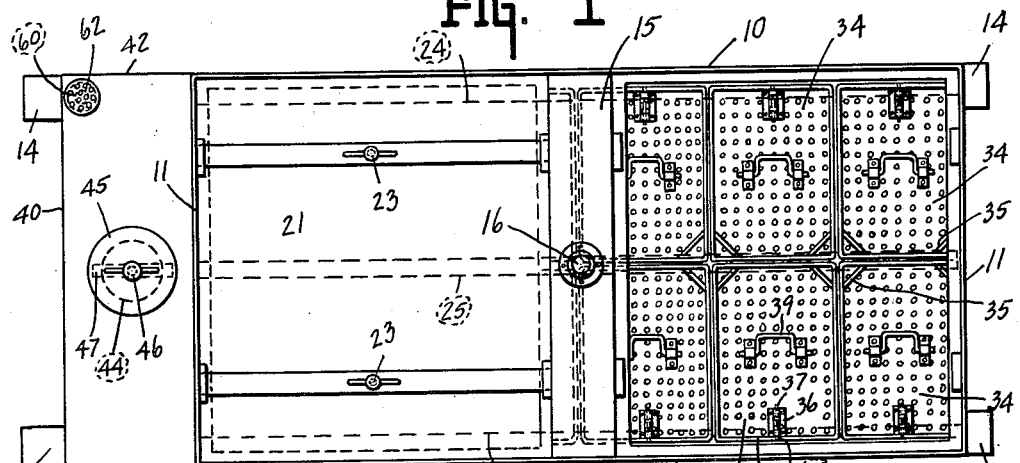
FIG. 1
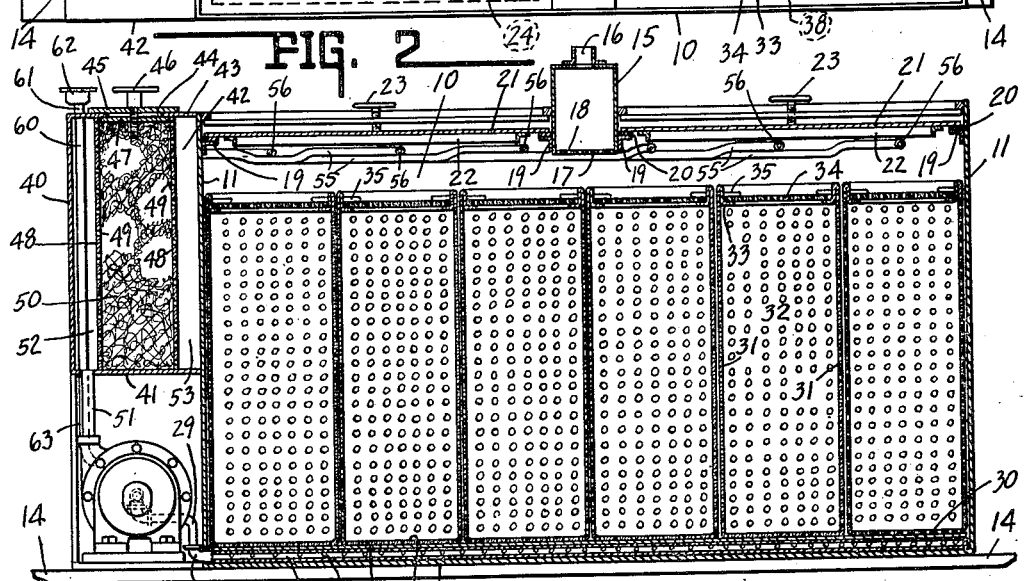
FIG. 2
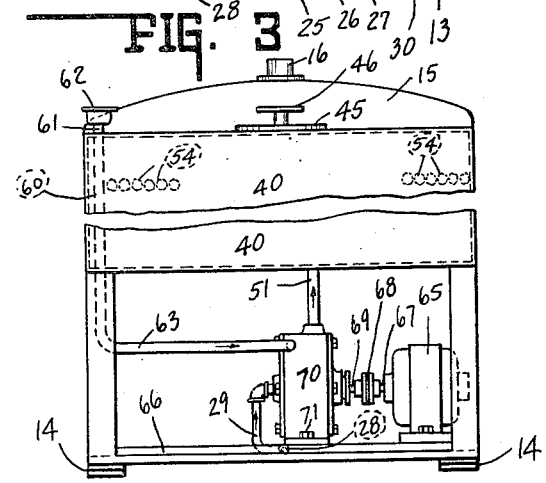
FIG. 3
FIG. 4
INVENTOR.
JAMES F. HALDEMAN.
BY Lockwood Goldsmith & Galt
ATTORNEYS.

July 9, 1940. J. F. HALDEMAN 2,207,514
EMULSIFYING AERATING DEVICE FOR FISH CONTAINERS
Filed Dec. 6, 1937 2 Sheets-Sheet 2
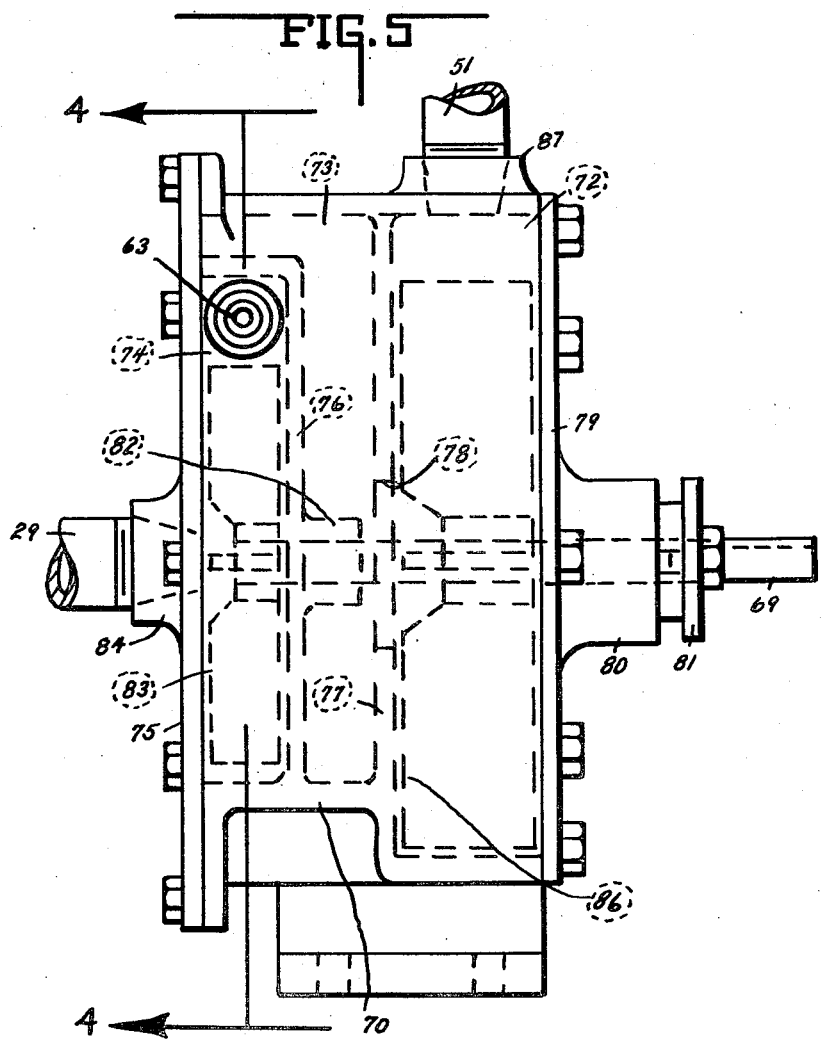
INVENTOR.
JAMES F. HALDEMAN.
BY
Lockwood, Goldsmith & Galt
ATTORNEYS.

Patented July 9, 1940

2,207,514

UNITED STATES PATENT OFFICE 2,207,514

EMULSIFYING AERATING DEVICE FOR FISH CONTAINERS

James F. Haldeman, Martinsville, Ind.

Application December 6, 1937, Serial No. 178,343

3 Claims. (Cl. 261—21)

This invention relates to a unitary shipping structure adapted for the shipment of live fish.

The chief object of this invention is to provide a structure which is adapted to maintain fish in a live condition throughout a transportation period and which device is so arranged that the fish may be seggregated according to size and species as desired so that a unit shipment may include a variety of fish of different size and species and yet not require individual equipment for maintaining the shipping medium in the desired clean and aerated condition.

The invention herein disclosed is peculiarly adaptable for oversea shipment.

Another object of the invention is to provide an aerating and filter structure which includes basically a compact and simple arrangement for aerating and filtering the tank water.

One feature of the invention consists in the utilization of a multi-stage pump, the air for aeration purposes being supplied to the water handled by the pump through an injector or aspirator arrangement and the second stage of the pump serving as an air emulsifier or homogenizer for beating the air into the water discharged from the pump.

Other objects and features of the invention will be set forth hereinafter more specifically.

The full nature of the invention will be understood from the accompanying drawings and the following specification and claims:

In the drawings, Fig. 1 is a top plan view of a shipping structure embodying the invention, the right hand cover portion being removed.

Fig. 2 is a longitudinal, sectional view of the shipping structure embodying the invention.

Fig. 3 is an end view thereof.

Fig. 4 is an enlarged transverse sectional view taken on line 4—4 of Fig. 3 and in the direction of the arrows and of the injector portion of the multistage pump.

Fig. 5 is an enlarged side elevation of the multistage aspirating pump structure.

In the drawings 10 indicates two side walls and 11 two end walls of a main container. The end walls may be extended at one end to form a compartment at said end and reference will be had thereto subsequently. The bottom is indicated by the numeral 13 and there may be suitably secured thereto the runners or skids 14 to facilitate movement of the device. The upper end of the container is bridged by a stationary tubular structure 15 which has a vent 16 at its upper central portion—see Figs. 1 and 2—and the bottom thereof is closed by a perforated plate 17 having perforations 18 therein.

The two openings to the container at each side of the device 15 are defined by the flange arrangement 19 that mounts a cushion gasket 20 upon which bears a cover plate 21 having the reenforcing flange 22. Suitable anchor means 23 are arranged to rigidly secure the cover plates 21 in position. Near the bottom at each side there is provided inwardly extending angle members 24 which constitute rests or supports for the smaller containers positioned within the main tank or container and which will hereinafter be described more fully.

Extending along the bottom and medianly thereof and parallel to the two side support flanges 24, is a pipe 25 having the apertures 26 therein at opposite sides. Positioned thereabove is a plate 27 and this serves as an intermediate support for the smaller containers. The pipe 25 extends through the end wall 11 at the left—see Fig. 2—and the end 28 thereof is connected to a pump intake line 29.

Herein it will be observed that approximately two rows of six containers may be utilized and positioned within the main container. Each smaller container has a perforated bottom 30, perforated side walls 31 and perforated end walls 32. The top of the container is provided with a flange arrangement 33 and a detachable cover 34, also perforated, is supported by the flange arrangement. The cross members 35 serve as retainers for one end of the cover.

A latch arrangement 36 has a bolt 37 adapted to seat in an aperture 38 in the flange 33 and thus maintain the smaller container in covered relation. The cover 34 includes the handle portion 39 by which it may be grasped and the entire container with its contents, except for the water which draws therefrom, removed from the main container. The arrangement illustrated is such that the containers are positioned in spaced relation to the bottom of the main tank and are positioned in spaced relation to the top or cover arrangement of the main tank and may, if desired, be so arranged that they are positioned in spaced relation to the side walls of the main tank, it being understood that the main tank is filled with water to the desired level and, therefore, the spaces below and about the several tanks include water and this water is of the same character as that within the several smaller containers.

These several smaller containers are adapted to contain fish segregated according to size of species. In this way a complete unit is adapted for the transportation of the different kinds of fish without danger of the larger destroying the smaller or the mixing of the various species.

The main container of this character is adapted for the shipment of from 35,000 to 50,000 fish, depending upon the size of the same.

It will be obvious, if this large number of fish is to be retained in this type of shipping container, for an appreciable period, as for example, a three or four-day motor haul to the sea coast, or for a five to ten day sea voyage in addition thereto or from an initial port shipment, that the water in the container must be purified and conditioned so that the fish in the several smaller containers arrive in a salable and/or useable condition.

As before described, it will be noted that the two main covers for the main container are sealed so that loss of water due to rocking of the boat or jostling in a truck or freight car is prevented. However, the main container cannot be entirely sealed, otherwise the fish will die. Therefore, the vent arrangement shown in the central portion of Fig. 1 and the central upper portion of Fig. 2 is provided and this vent arrangement prevents the loss of water due to travelling conditions described, but permits the escape of carbon dioxide, and the like, from the container which is generated by the fish therein during the transportation period. In view of the large number of fish that may be and have been shipped in a structure of this kind, it is imperative that, as stated, the water be maintained in as pure a condition for the fish as possible. This means that dirt and debris, and the like, initially included in the water, for example, or discharged to the water as a result of fish waste, must be removed. Likewise, to insure live delivery of the fish, sufficient oxygen must be supplied to the water.

Reference will now be had, therefore, to the unitary filtering and aerating arrangement incorporated in the device as a unitary part thereof and so associated with the device that the same constitutes a part of a closed circulatory system of which the main tank constitutes the major portion.

At the left hand end of the structure—see Figs. 1 and 2—and in the upper portion thereof is a closed container having an end wall 40, a bottom 41, and two end walls 42, the latter being extensions of the walls 10, if desired. This container includes a cover 43 having an aperture 44 therein which is of handhole character and is adapted to be maintained in sealed relation by the handhole cover 45 and the securing means 46 and 47.

Extending from one wall 42 to the other and from the bottom 41 to the top 43 and adjacent the walls 40 and 11 but in spaced relation thereto, are the apertured partition plates 48 having the apertures 49 therein. In the space between the two apertured plates there is provided a filter medium which may be of any suitable character. It has been found that sponges 50 may be packed therein through the opening at the top of the filter compartment.

The lower end of the outermost compartment includes an intake 51 connected to a pump structure interposed between said intake and the tank discharge 28 and to which reference will be had more specifically hereinafter. The aerated water discharged by this pump passes upwardly under pressure into chamber 52 and thence through the ports 49 in the adjacent apertured plate 48, thence through the sponges 50 and thence through the apertures 49 in the opposite plate 48 into the chamber 53. Chamber 53 has a plurality of outlets 54, each of which communicates with a conduit 55, each of which terminates in turn in a nozzle 56. The nozzle 56 is directed inwardly from the side wall and the several conduits 55 are secured to the side wall 10 or the flange 19 carried thereby, and the nozzles discharge inwardly across the tops of the smaller containers 10 in the main tank. These nozzles may be of adjustable character so that the amount of water discharged from each is the same. The adjustable feature is provided in those instances where it is found that pipe friction losses materially effect the amount of discharge. All of the several pipes 55 are positioned on the side walls 10 and end wall 11 adjacent the filtering compartment and are protected by the flanges 19 against breakage or the like, in the insertion and removal of the several smaller containers from the main tank.

Extending through the filtering chamber is a conduit 60, the upper end 61 of which includes a filter with a screen arrangement 62 to prevent the entrance of bugs, dirt, and the like. This constitutes the air supply to the system. The lower end of the conduit 60 terminates below the filtering chamber as at 63 and connects to an injector tip 64, see Fig. 4.

Reference will now be had more especially to Figs. 2, 3, 4 and 5. In these figures 65 indicates a suitable source of power such as an electric motor mounted on a base portion 66 which preferably is a continuation of the bottom 13. The shaft 67 through coupling 68 drives the shaft 69 of the multi-stage emulsifying and aerating pump structure. This pump includes a main body portion 70 suitably secured as at 71 to the base 66 and includes three chambers 72, 73 and 74. A cover plate 75 suitably closes chamber 74, the first stage pump chamber and also the intermediate chamber 73 not otherwise closed by the partition 76 formed in the body and completing the first pump chamber.

The body also includes the partition 77 centrally apertured as at 78 which defines the two chambers 72 and 73. Chamber 72 is closed by the cover plate 79. The cover plate 79 includes a boss 80 centrally apertured to receive the pump shaft 69 and the same is sealed by a stuffing box structure 81. The shaft 69 extends through the opening 78 and is rotatably supported in the bearing 82 formed in the pump chamber forming partition 76 of the body portion. Shaft 69 terminates in the chamber 74 and mounts thereon the pump impeller 83.

The cover member 75 includes an apertured central boss 84 to which the discharge line 29 connects. This is the intake to the pump structure. The pump chamber 74 has a tangential discharge passage 85, see Fig. 4, discharging into the chamber 73. Coaxial with this discharge passage and extending through the same, is the tip 64—see Fig. 4—which, as before stated, is connected to the air supply line 63. As the pump 83 draws the water from the tank through the pipe 25 and discharges it into the chamber 73, the water discharged into this chamber has an injector or aspirator action and draws air into this chamber as well.

The mixture of air and water then is drawn inwardly through the central aperture 78 in the partition 77 into the second pump chamber 72, where it is engaged by the pump impeller 86 and this beats the water and air together so there results an emulsifying effect, and at the same time imparts additional pressure to the water now aerated and discharges under pressure the water from the tangential discharge passage 87 to the filter intake line 51 that discharges into the bottom of the chamber 52 of the filter structure.

There thus results a closed cycle arrangement in that as long as the pump is operated, water is continuously drawn from the bottom of the main container, aerated, filtered and discharged under pressure into the top of the main container by way of the nozzle structure previously described.

Since the several smaller containers are entirely of foraminated or open work character, the water can freely circulate from one to another and therefore, the debris in each container will gradually settle out through the foraminated bottoms and collect upon the bottom 13 of the main container. Such debris as may not thus settle out but remain in suspension near the bottom, will be drawn into the outlet pipe openings 26 and then be forced through the filter structure for removal, as previously described.

There is thus provided a compact, transportation unit, unitary in character, which permits the transportation of an enormous number of fish of different species and size and which will be capable to maintain said fish in the proper condition during the transportation period.

While the invention has been described in great detail in the foregoing description and similarly illustrated in the drawings, the same is to be considered as illustrative only and not restrictive in character. The aforesaid modifications as well as others which will readily suggest themselves to persons skilled in this art, are all considered to be within the broad scope of this invention, reference being had to the appended claims.

The invention claimed is:

1. An aerating pump of dual fluid multi-stage pressure and injector type including in combination a pump body means having three side-by-side, axially aligned, sequentially communicating chambers comprising two end chambers and an intermediate chamber, a pressure impeller in each end chamber, said impellers having a common axis, the liquid intakes to the two end chambers being coaxial with the said common impeller axis, the discharges from each end chamber being directed angularly of the impeller axis in the respective chamber enclosing the impeller, jet means for supplying air at a pressure normally below that inherent in the first of the sequentially connected chambers, the latter and the jet means having a common discharge into the intermediate chamber into the intermediate chamber whereby said jet means is subject to the suction incident to the liquid discharged under pressure from the first of the sequentially connected chambers and created by the impeller therein, the impeller in the other end chamber increasing the pressure of the aerated liquid and further dispersing the jet means supplied air throughout the liquid, said jet means discharging with the first of the sequentially connected chambers liquid discharge and tangentially into the intermediate chamber adjacent the outer wall thereof for swirling of the aerated liquid in the intermediate chamber for further air dispersion in the liquid previous to axial discharge of the aerated liquid from the intermediate chamber to the said other sequentially connected end chamber.

2. A device as defined by claim 1 wherein the pump body means includes a tubular structure, and end plates for closing same, a single shaft extending through one end plate and two of the sequentially connected chambers and into the remaining chamber remote from the last mentioned end plate, the impellers in the end chambers being rigid with said shaft, the other end plate including an aperture coaxial with the shaft for pump intake purposes.

3. A device as defined by claim 1 wherein the pump body means includes a tubular structure, and end plates for closing same, a single shaft extending through one end plate and two of the sequentially connected chambers and into the remaining chamber remote from the last mentioned end plate, the impellers in the end chambers being rigid with said shaft, the other end plate including an aperture coaxial with the shaft for pump intake purposes, said tubular structure including partitions spaced apart to form said intermediate chamber and spaced from the end plates to form therewith the end chambers, one partition being centrally apertured for shaft support and the other partition being similarly apertured for chamber communication, the shaft extending through the last mentioned aperture.

JAMES F. HALDEMAN.